United States Patent [19]

Yagi et al.

[11] Patent Number: 4,503,297
[45] Date of Patent: Mar. 5, 1985

[54] STEERING EFFORT SENSOR

[75] Inventors: Eiji Yagi, Ayase; Yukiyoshi Hatori, Tokyo; Yuji Kobari, Yokosuka, all of Japan

[73] Assignee: Nissan Motor Company, Limited, Yokohama City, Japan

[21] Appl. No.: 447,886

[22] Filed: Dec. 8, 1982

[30] Foreign Application Priority Data

Dec. 21, 1981 [JP] Japan ................. 56-206686

[51] Int. Cl.³ ............................................. H01H 3/16
[52] U.S. Cl. .................................................. 200/61.39
[58] Field of Search .................. 192/150; 464/35; 200/61.39, 153 N

[56] References Cited

U.S. PATENT DOCUMENTS

| 2,100,076 | 11/1937 | Gilmore | 200/153 N |
| 2,427,453 | 9/1947 | Hadley | 200/61.39 |
| 2,920,156 | 1/1960 | Rice et al. | 200/61.39 |
| 3,428,765 | 2/1969 | Ludwig | 200/61.39 |
| 3,450,850 | 6/1969 | Ruschke | 200/61.39 |
| 3,693,770 | 9/1972 | Charchian et al. | 200/61.39 X |

FOREIGN PATENT DOCUMENTS

| 11579 | 5/1980 | European Pat. Off. |
| 50-160921 | 6/1974 | Japan |
| 54-3735 | 1/1979 | Japan |
| 54-6246 | 1/1979 | Japan |
| 54-17228 | 2/1979 | Japan |
| 55-44013 | 3/1980 | Japan |
| 557258 | 9/1972 | Switzerland |
| 1220648 | 7/1969 | United Kingdom ............. 200/61.91 |
| 2015443 | 9/1979 | United Kingdom |

Primary Examiner—J. R. Scott
Attorney, Agent, or Firm—Schwartz, Jeffery, Schwaab, Mack, Blumenthal & Koch

[57] ABSTRACT

A sensor arrangement features a rolling element and cam groove arrangement which induces a displacement via which a switch may be closed to indicate that torque is being applied via a steering wheel to an upper section of a steering shaft arrangement and which provides an essentially instantaneous drive connection between the upper and a lower section of the steering shaft arrangement thus maintaining a desirable degree of torsional rigidity.

16 Claims, 33 Drawing Figures

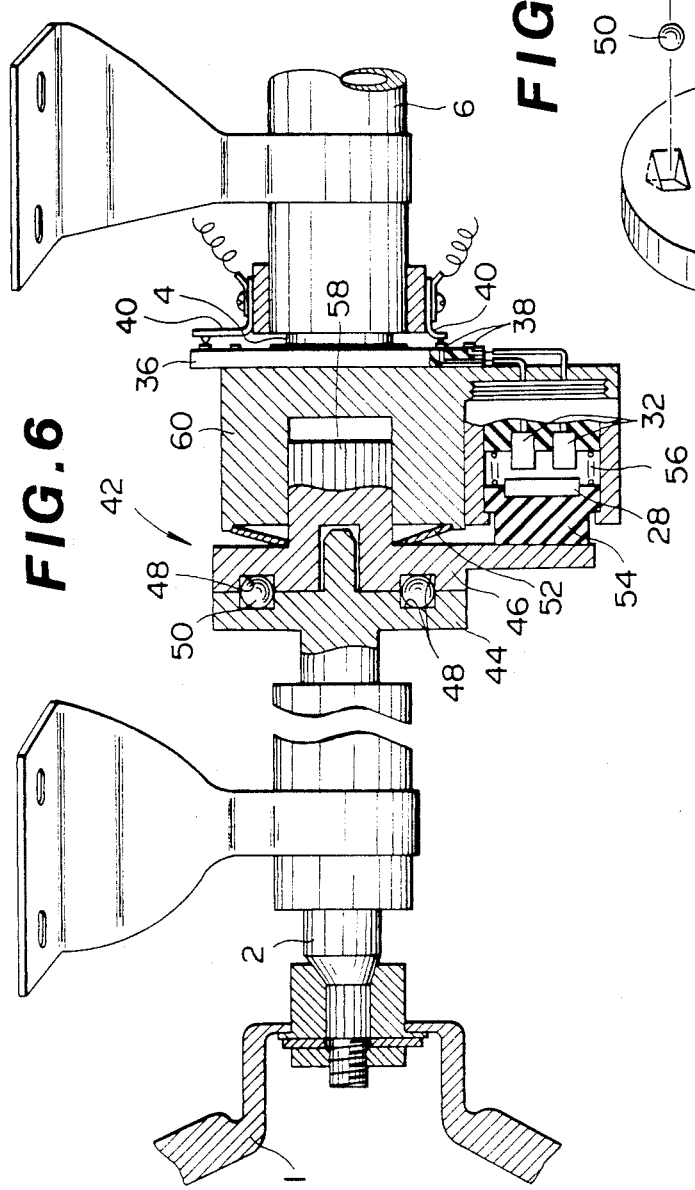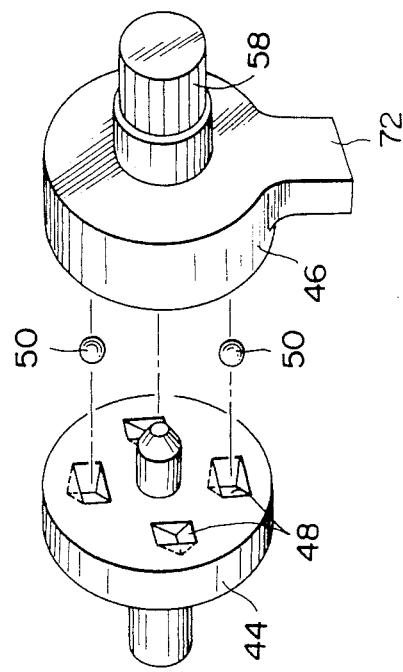

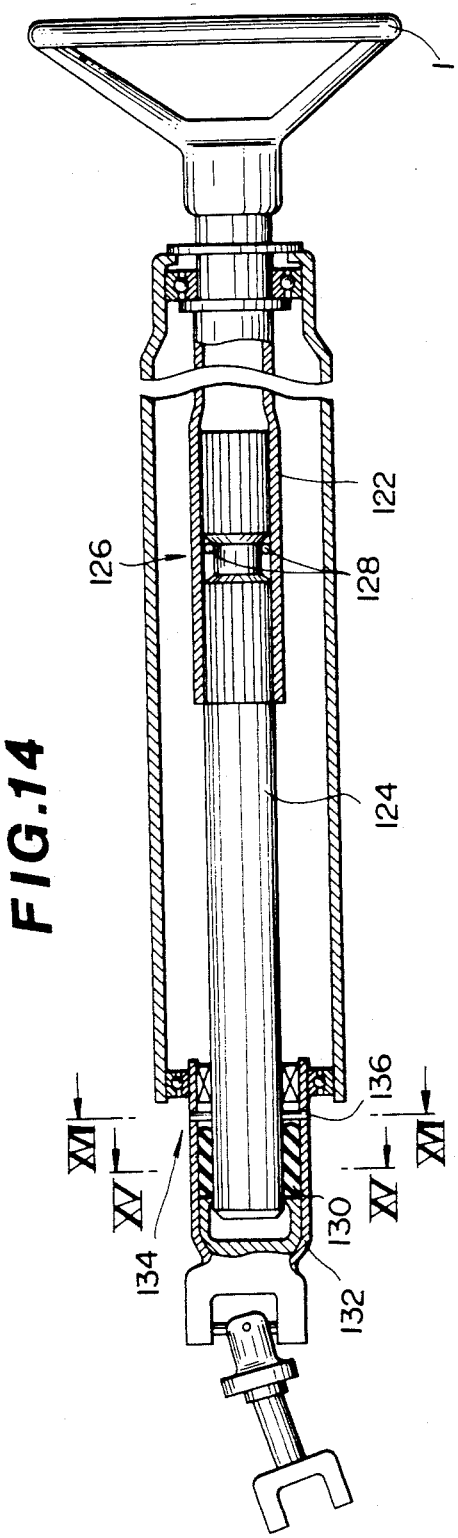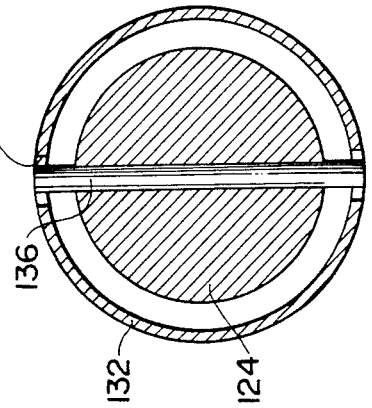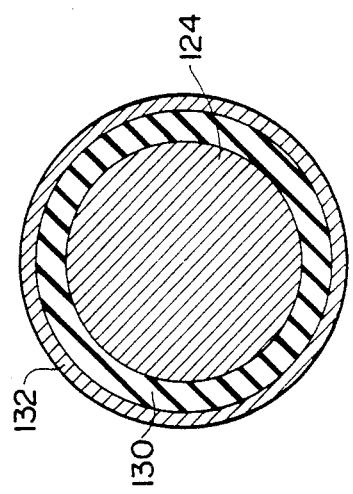

STEERING EFFORT SENSOR

BACKGROUND OF THE INVENTION

1. Field of the Invention

The present invention relates generally to a steering effort sensor for discriminating between steering and non-steering periods and more specifically to an improved sensor arrangement which provides a positive drive connection between the steering wheel and the steering gear.

2. Description of the Prior Art

In one previously proposed sensor arrangement upper and lower sections of a steering shaft are interconnected by a torsion bar and a switch is provided which is closed upon a given amount of relative displacement between the two sections. However, this arrangement has suffered from a loss of torsional rigidity in the steering shaft and and has required that the components constituting the switch mechanism be produced within very close tolerances. A full disclosure of this arrangement may be found in Japanese Patent application Provisional Publication No. Sho 50-160921.

Further examples of previously proposed sensor arrangements may be found in:

(a) Japanese Patent Application Provisional Publication No. Sho 54-3735, which discloses an arrangement wherein a sensor device is disposed within the steering which per se, so as to be interconnected between an outer shell and an inner frame thereof;

(b) Japanese Patent Application Provisional Publication No. Sho 54-6246 which discloses an arrangement wherein the steering wheel is connected to the steering column through an elastomeric bush and a strain gauge is mounted on the steering wheel and connected to the steering shaft downstream of the bush via a suitable bracket;

(c) Japanese Patent Application Provisional Publication No. Sho 55-17228 which discloses an arrangement wherein the sensor is operatively disposed in one of the steering wheel spokes and the remaining spokes are either connected to the steering shaft through springs or elastomeric members so as to permit sufficient movement of the wheel with respect to the steering shaft; and (d) Japanese Patent Application Provisional Publication No. Sho 55-44013 which discloses a strain gauge operatively connected to the steering shaft to detect the torque applied thereto.

However, all of these have either required overly precise production, have lacked torsional rigidity have been susceptible to changes in ambient temperature.

SUMMARY OF THE INVENTION

It is an object of the present invention to provide a steering effort sensor which provides a mechanical drive connection between the steering wheel and steering gear, which is not susceptible to changes in ambient conditions, which exhibits high torsional rigidity and which may be readily mass produced.

The present invention features a sensor arrangement wherein a rolling element and cam groove arrangement induces a displacement via which the torque applied an upper section of the steering shaft through the steering wheel may be sensed and which provides an essentially instantaneous drive connection between the upper and lower sections of the steering shaft thus maintaining a desirable degree of torsional rigidity.

More specifically, the invention takes the form of an apparatus having a torque input member and a torque output member, a device for interconnecting the torque input and output members in a manner as to provide a drive connection therebetween and for indicating that torque is being applied to the input member comprising, means defining a groove in one of the input member or a first element associated therewith, a rolling element received in the groove, first means including a second element which cooperates with the rolling element and uses a reaction produced between the groove and the rolling element for causing the output member to rotate in the same direction as the input member when torque is applied to said input member and for displacing the second element, and a second means responsive to the displacement of the second element for producing a signal indicative of the application of torque to the input member.

BRIEF DESCRIPTION OF THE DRAWINGS

The features and advantages of the arrangement of the present invention will become more clearly appreciated from the following description taken in conjunction with the accompanying drawings in which:

FIG. 6 is a longitudinal partially sectioned view of a second embodiment of the present invention;

FIG. 7 is a perspective view showing the ball and groove arrangements which form a vital part of the second embodiment;

FIGS. 11 and 12 are respectively, a longitudinal section and a cross-section of a sixth embodiment of the present invention and wherein FIG. 12 is a sectional view taken along section line XII—XII of FIG. 11;

FIG. 14 is a partially sectioned side elevation of an example of a steering wheel and steering shaft arrangement to which the present invention may be applied;

FIGS. 15 and 16 are respectively sections taken along section lines XV—XV and XVI—XVI of FIG. 14;

FIGS. 19 to 25 are views of varius portions of the eighth embodiment and wherein FIG. 21 is a section taken along section line XXI—XXI of FIG. 17;

DETAILED DESCRIPTION OF THE PREFERRED EMBODIMENTS

Figure 1:
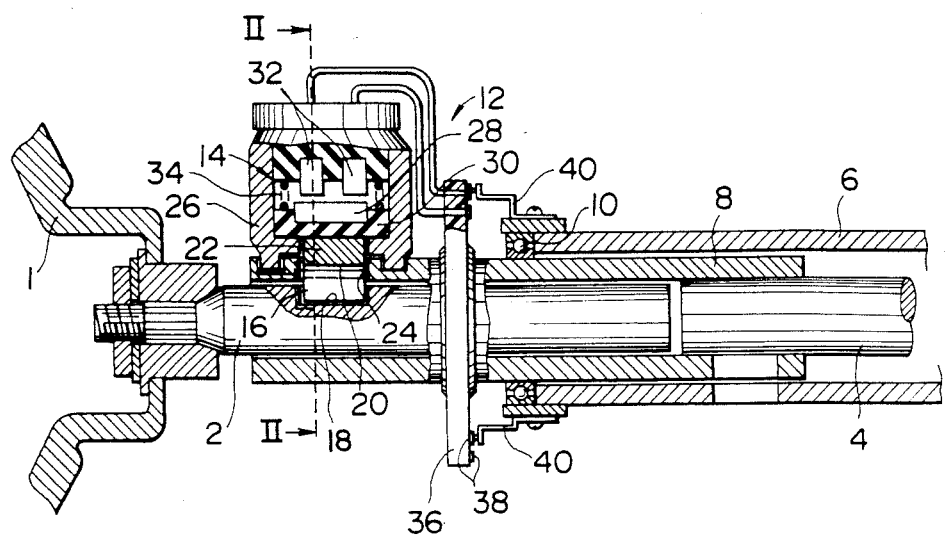
FIG. 1 is a sectional view of a first embodiment of the present invention.
Figure 2:
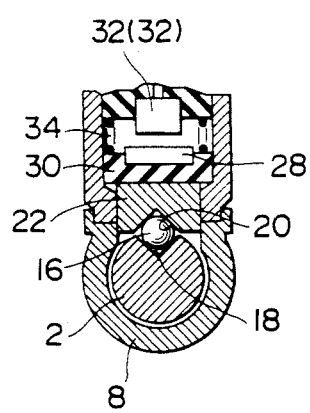
FIG. 2 is a sectional view taken along section line II—II of FIG. 1.
Figure 3:
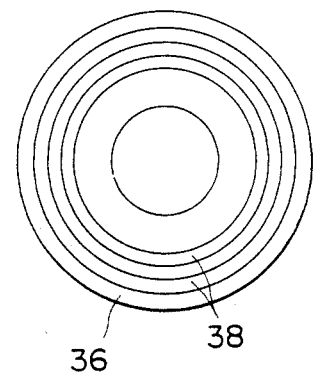
FIG. 3 is a front elevation of a disc member forming part of the first embodiment and on which circular electrodes are formed.

Turning to FIGS. 1 to 3 of the drawings a first embodiment of the present invention is shown. In this arrangement, a steering wheel 1 is connected to an upper section 2 of a steering shaft arrangement. The lower section 4 of the steering shaft is, as shown, rotatably disposed in a column tube 6. A connection sleeve 8 is fixedly connected to the upper end of the lower shaft section 4 and rotatably supported in the column tube through a roller bearing 10. The upper and lower sections 2, 4 of the steering shaft are operatively interconnected by a sensor arrangement (generally denoted by the numeral 12) mounted on said connection sleeve 8. As best seen in FIG. 2 the sensor arrangement 12 consists of a switch 14, which in this case is of the mechanical moving contact type, and a rolling element 16 (in this case a cylindrical roller) which is operatively disposed in "V"-shaped grooves 18, 20 formed respectively in the upper steering shaft section 2 and a piston-like member 22 slidably disposed in a radial bore 24 formed in the connection sleeve 8. In this embodiment the switch housing 26 is threadedly received in an annular recess formed in the connection sleeve 8.

The switch 14 in this embodiment includes a movable contact 28 mounted on the piston-like member 22 through a suitable insulating cup-like contact holder 30, and first and second stationary contacts 32 which are connected by the movable contact 28 upon the latter being displaced sufficiently against the bias of the spring 34.

A disc 36 is mounted on the connection sleeve 8 and adapted to be synchronously rotatable therewith. As shown, a pair of annular electrodes 38 or contact rings are formed on one face of the disc 36 and a pair of stationary pickups 40 each adapted to contact one of the annular electrodes 38 is insulatingly mounted on the column tube 6. Each of the annular electrodes 38 is as shown in FIG. 1, electrically connected with one of the first and second stationary contacts 32. This arrangement permits the steering wheel 1 to be rotated in either direction while maintaining a constant electrical connection with the power steering pump clutch control circuit (not shown).

The operation of the above described arrangement is such that when the steering wheel 1 is rotated, the rolling element 16 is cammed by the lower "V" shaped groove 18 to react against the upper groove 20 in a manner that the piston-like member 22 is driven against the bias of the spring 34 to move the movable contact 28 upward toward the stationary contacts 32 while inducing said piston-like element to rotate about the axis of the upper steering shaft section 2. Hence, simultaneously the interconnection between the upper steering shaft section 2 and the connection sleeve 8 provided by the rolling element 16 and grooves 18,20, provides a positive drive connection between the upper and lower shaft sections 2, 4 while displacing the piston-like member 22 to permit the steering effort to be readily indicated.

Figure 4:
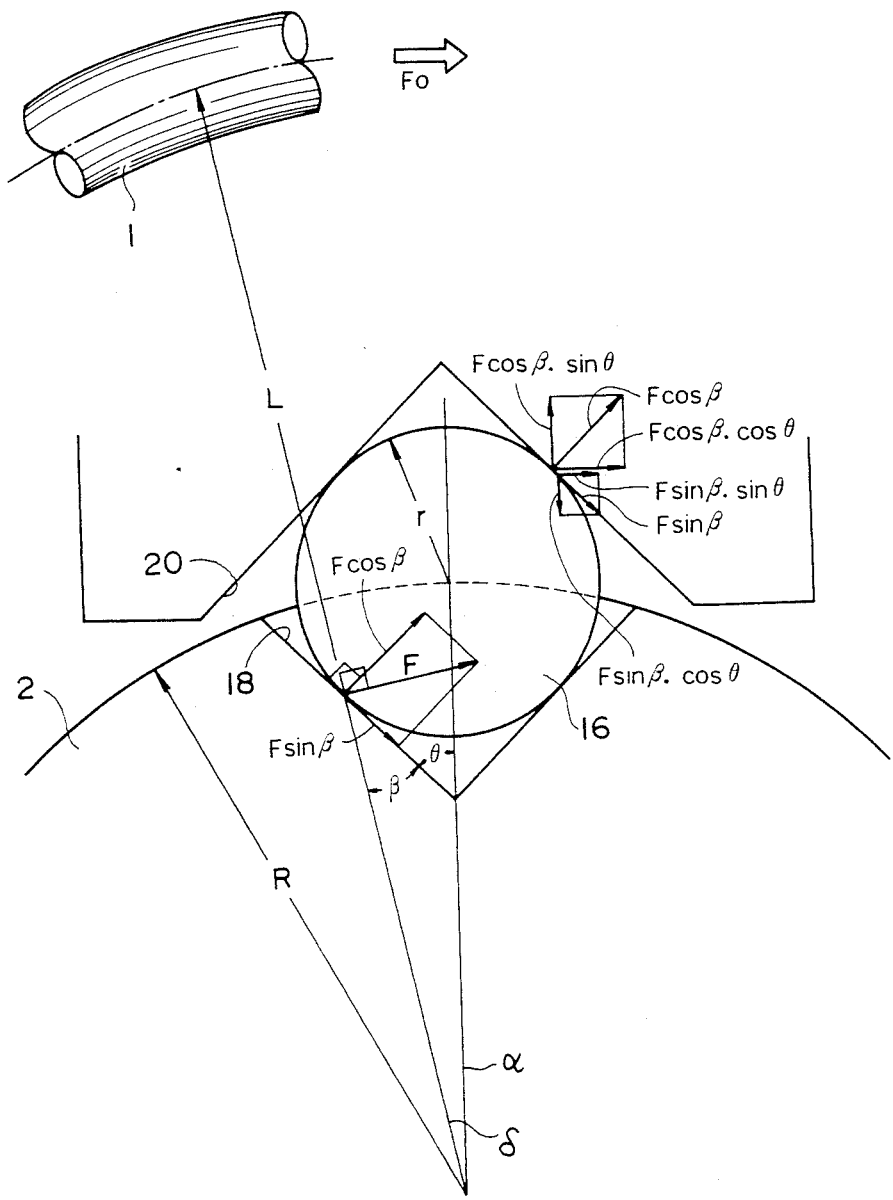
FIG. 4 is a schematic drawing showing in vector diagram form, the forces acting on the ball and cam surfaces which characterize the present invention.

FIG. 4, shows schematically the rolling element and groove arrangement which forms a vital part of the just discussed embodiment.

In this figure, given that:

the steering wheel 1 is rotated clockwise as shown by the arrow $F_0$;

that the force accordingly applied to the upper steering shaft section 2 firstly exerts on the rolling element or roller 16, a force represented by a vector F (which force is divided into a component $F \sin \beta$ parallel with the side of the groove 18 and a component $F \cos \beta$ perpendicular to said side);

that $\theta$ is the angle defined between the side of groove 18 and a plane $\alpha$ bisecting the apex angle of the "V" shaped groove 18, and $\beta$ the angle defined between a plane $\delta$ passing through the line of action on the rolling element 16, the center line of the shaft section 2 and the side of the groove 18;

that the components $F \sin \beta$ and $F \cos \beta$ both act at the point of application between the side of the groove 20 and the rolling element 16; and that the force $F \sin \beta$ acting at the point of application is subdivided into a components $F \sin \beta \cdot \sin \theta$ and $F \sin \beta \cdot \cos \theta$, while the force component $F \cos \beta$ is divided into components $F \cos \beta \cdot \cos \theta$ and $F \cos \beta \cdot \sin \theta$.

Then the force which develops the steering torque can be expressed as a resultant force of the vector $F \sin \beta \cdot \sin \theta$ and the vector $F \cos \beta \cdot \cos \theta$, $F \cos (\theta - \beta)$ and the force tending to displace the piston-like member 22 can be expressed as a resultant force of the vector $F \sin \beta \cdot \cos \theta$ and the vector $F \cos \beta \cdot \sin \theta$, $F \sin (\theta - \beta)$. Hence, given that the radius of the shaft section is R and the radius of the roller r, $\cos (\theta - \beta)$ and $\sin (\theta - \beta)$; then values for the above may be obtained using the following equations:

$$\cos (\theta - \beta) = \frac{R - r \sin \theta}{\sqrt{R^2 + r^2 - 2Rr \sin \theta}} \quad (1)$$

$$\sin (\theta - \beta) = \frac{r \cos \theta}{\sqrt{R^2 + r^2 - 2Rr \sin \theta}} \quad (2)$$

With these equations, the force $F \cos (\theta - \beta)$ developing a steering torque and the force $F \sin (\theta - \beta)$ tending to move the piston-like member 22 may be respectively derived using equations 3 and 4 as follows:

$$F \cos (\theta - \beta) = \frac{F(R - r \sin \theta)}{\sqrt{R^2 + r^2 - 2Rr \sin \theta}} \quad (3)$$

$$F \sin (\theta - \beta) = \frac{Fr \cos \theta}{\sqrt{R^2 + r^2 - 2Rr \sin \theta}} \quad (4)$$

Figure 5:
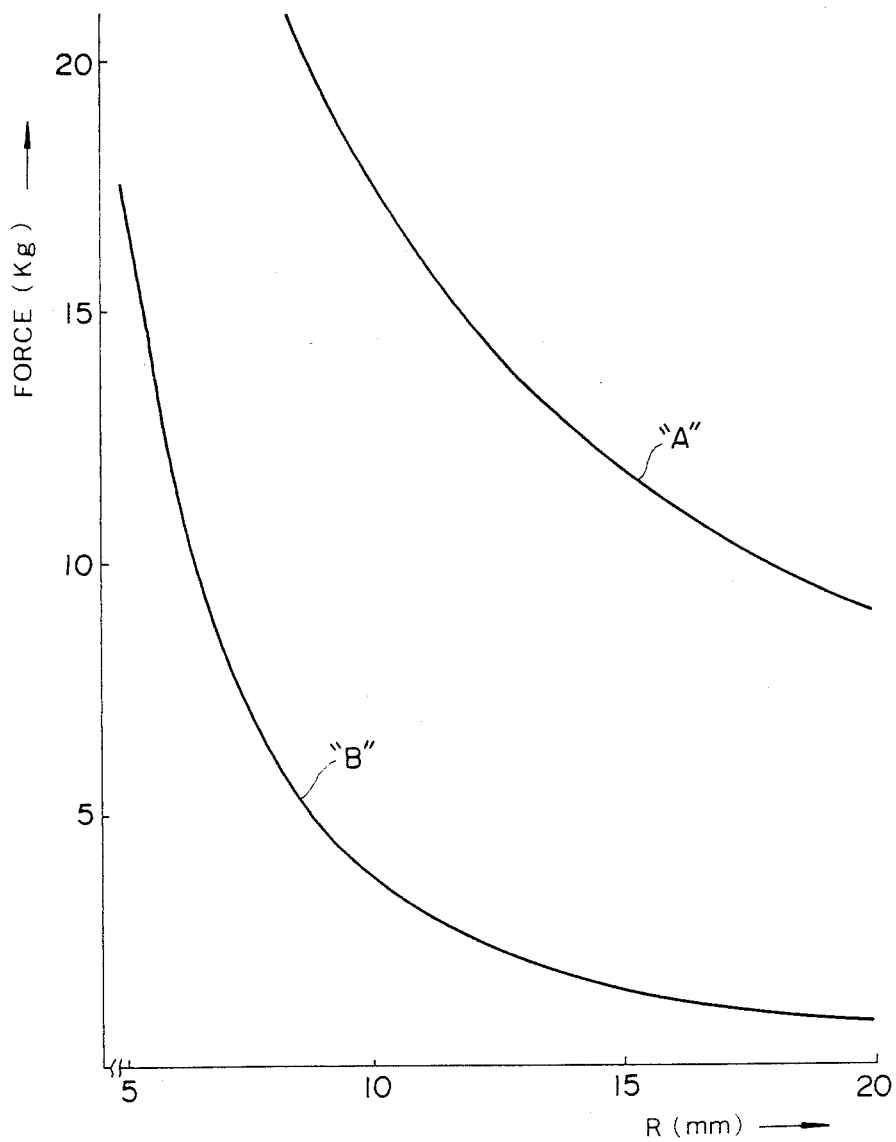
FIG. 5 is a graph showing in terms of force and steering shaft diameter, the the force applied to a moving element of the sensor and that transmitted from one shaft section to the other.

The vector F may be derived using the equation:

$$F = (L/R) F_0 \quad (5)$$

where L is the distance between the center of the shaft section and the steering wheel and $F_0$ the force rotating the steering wheel 1;

Thus, in the case that L=180 mm and $F_0$=k kg, then F=180/R by way of example. Under these conditions and when r=2.5 mm and $\theta$=45°, the force producing the steering torque and the force displacing the piston-like member 22 will be understood from the above equations to vary in accordance with the radius R as indicated by curves "A" and "B" in FIG. 5, respectively.

By way of example, let it be assumed that the radius R of the shaft section 2 is 15 mm, for example. Then, it will be apparent from the curves "A" and "B" shown in FIG. 5 that the force developing the steering torque is approximately seven times that which tends to displace the piston-like member 22. Therefore, with the present invention, almost all of the steering effort (F₀) applied to the steering wheel 1 effectively develops steering torque even during the very initial movement of the steering wheel while simultaneously inducing operation of the switch 14 via displacement of the piston-like member 22. Essentially no delay occurs between the rotation of the steering wheel 1 and the rotation of the lower shaft section 4. This maximizes the torsional rigidity of the steering system and, thereby, ensures excellent response to the manipulation of the steering wheel 1.

Apart from the advantage mentioned above, the apparatus of the invention is inexpensive because it does not require parts which need precision machining and is simple in construction. Moreover, the absence of structural elements susceptible to changes of temperature and other ambient conditions permits a noticeable increase in reliability.

It will be noted that although the switches disclosed throughout the present specification are of the mechanical moving contact type, light emitting arrangements or the like may be utilized in place thereof.

Turning now to FIGS. 6 and 7, a second embodiment of the present invention is shown. In this embodiment the upper and lower sections 2, 4 of the steering shaft are interconnected through a steering effort sensor 42 which basically takes the form of two disc members 44, 46 in which a plurality of "V" shaped grooves 48 are formed and in which grooves rolling elements in the form of balls 50 are disposed. As shown in FIG. 6, when torque is not applied to the upper steering shaft section 2, the two disc members 44, 46 contact each other. However, when a torque is applied through the steering wheel 1, the balls 50 under the camming action of the "V" shaped grooves 48 tend to drive the disc 46 away from the disc 44 thus compressing the spring 52 (in this case a Belleville type) and moving a cup-like contact holder 54 (formed of a suitable insulator) against the bias of a spring 56 so as to move the movable contact 28 toward the stationary contacts 32. In this arrangement the disc 46 is formed with a shaft section 58 which is externally splined and reciprocatively received in a blind bore formed in a boss-like member 60 provided on the end of the lower steering shaft section 4. As in the previous embodiment an annular contact carrying disc 36 is fixed to the lower face of the boss 60 so as to operatively juxtapose a pair of stationary pick-ups 40 provided on the column tube 6. In this embodiment the reaction to the camming action on the rolling elements 50 by the "V" shaped grooves 48 is provided by the Belleville spring 52 and as such the spring 56 is preferably weak as compared with the spring 34 of the first embodiment.

The operation of this embodiment is similar to that of the first and features a substantial split between the force acting to move the disc 46 away from the disc 44 and the force acting to induce the mutual rotation thereof and hence to induce the upper and lower shaft sections to rotate essentially synchronously.

Figure 8:
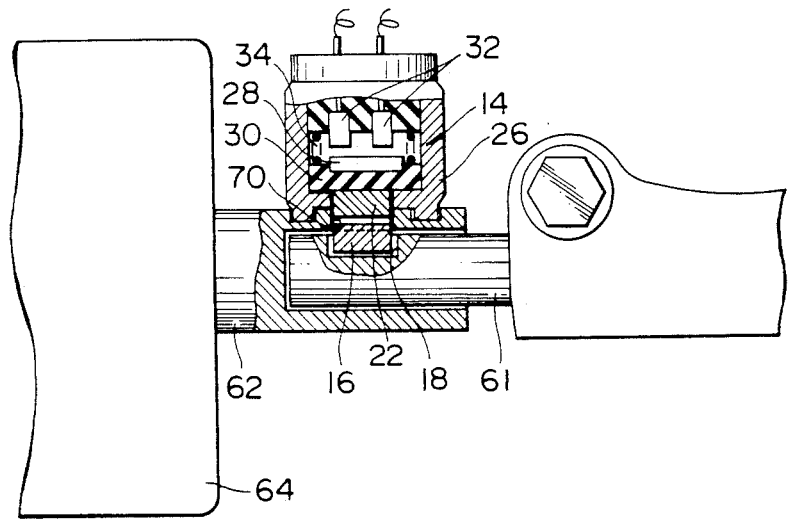
FIG. 8 is a partially sectioned view of a third embodiment of the present invention.
Figure 9:
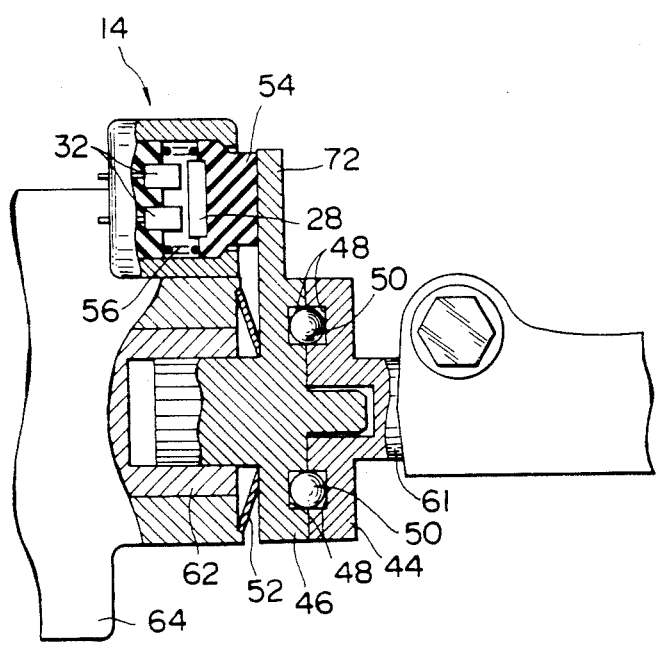
FIG. 9 is a partially sectioned view showing a fourth embodiment of the present invention.

It will be appreciated that the sensor according to the present invention need not be provided at the upper end of the steering shaft and may be alternately provided by way of example, at the bottom thereof. FIGS. 8 and 9 show such embodiments.

In FIG. 8 an arrangement is shown in which the construction described with reference to FIGS. 1-3 is located at the bottom of a steering shaft 61. As shown, the input shaft 62 of the power steering control valve 64 is formed with a blind bore which is adapted to slidably receive the end of the steering shaft 61 therein. The steering shaft 61 is machined with a generally V-shaped groove 18 similar to the groove shown in FIGS. 1 and 2. The input shaft 62 is formed with a radial bore 70 with which the groove 18 is aligned. A piston-like member 22 similar in design to that shown in FIGS. 1 and 2, is reciprocatively disposed in the radial bore 70. A rolling element or roller 16 is disposed between the groove 18 and a groove formed in the piston-like member 22. A switch similar to the switch of FIGS. 1 and 2 has its casing or housing 26 threaded into an annular recess formed in the outer periphery of the input shaft 62 so as to be coaxial with the piston-like member 22.

FIG. 9 shows a fourth embodiment, the construction of which is similar to that shown in FIGS. 6 and 7 but which is applied to the power steering control valve input shaft 62. In this arrangement a disc member 46 (which is similar to the second embodiment and which functions as a coupling member) is splined to the blind bore in the input shaft 62. The steering shaft 61 is formed with a disc member 44 at the end thereof in which V-shaped grooves 48 which face the V-shaped grooves 48 formed in the disc member 46 (coupling member), are formed. Balls 50 are received in the respective pairs of grooves 48. The disc member 46 is constantly urged toward the disc member 44 by a Belleville spring 52. The switch 14 has the housing mounted on the casing of power steering control valve 64 with the contact holder 54 abutted against an arm 72 extending from the disc 46.

Figure 10:
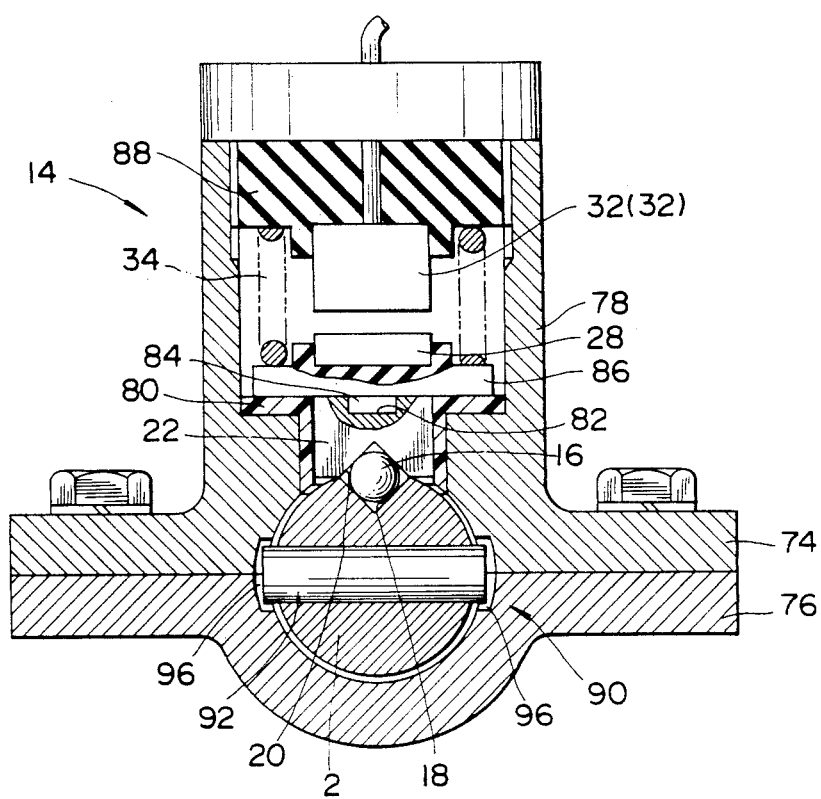
FIG. 10 is a cross-sectional view of a fifth embodiment of the present invention.

FIG. 10 shows a fifth embodiment of the present invention. In this arrangement the connection sleeve per se is split into upper and lower portions 74, 76 which are interconnected by bolts. The upper portion 74 includes a switch housing portion 78 in which a stepped bore is formed and in which the switch arrangement is disposed. In this arrangement the piston-like member 22 (or piston as it will be referred to hereinafter) in which the "V" shaped groove 20 is formed, is slidably received in a grommet-like bush 80 formed of a material having a low coefficient of friction. The upper surface of the piston 22 is provided with a recess 82 for receiving a projection 84 formed on the lower side of a contact holder 86. As shown, the movable contact 28 is disposed in a recess formed on top of the contact holder 86. A coil spring 34 is interposed between the contact holder 86 and an elastomeric plug 88 disposed in the upper open end of the bore to close the bore.

This arrangement is deemed advantageous in that the bushing 80 guides the piston 22 smoothly as it strokes up and down. It will be appreciated that, though the bore may be relatively short, the piston will reciprocate smoothly without requiring the bore to be precision machined or the outer periphery of the piston to be polished. This eliminates any sticking or jamming of the piston 22 during operation. The interengaged projection and recess 84, 82 maintain the contact holder 86 in its centered position relative to the piston 22 so that the need for guiding the contact holder via contact with the inner periphery of the switch housing is eliminated. This makes it possible to define a clearance between the contact holder 86 and the housing and thus minimize frictional resistance, thereby enhancing the operability of the switch.

This embodiment further features a lost motion connection 90 between the upper steering shaft section 2 and the upper and lower portions 74, 76 for protecting the switch arrangement from damage in the event of a malfunction the power steering system. In this arrangement the lost motion device takes the form of a pin 92 disposed though a radial bore 94 formed in the shaft section 2 and extending into suitable recesses 96 formed in the upper and lower halves 74, 76 of the divided coupling sleeve. With this arrangement, should the power steering system malfunction and the driver be forced to manually apply a notably increased force to the steering wheel 1 to steer the vehicle, the pin 92 will move through the void defined by the recesses 96 sufficiently to permit the movable contact 28 to engage the stationary contacts 32 and shortly thereafter and before any excessive force damages the switch mechanism, positively interconnect the steering shaft section 2 and the divided coupling sleeve.

Figure 11:
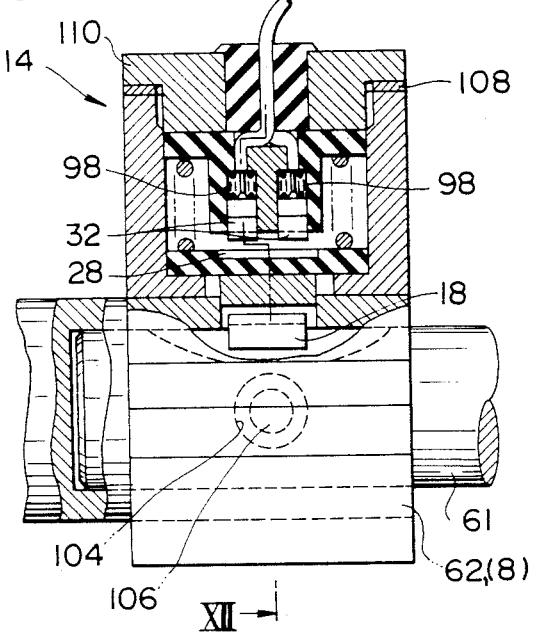
Figure 12:
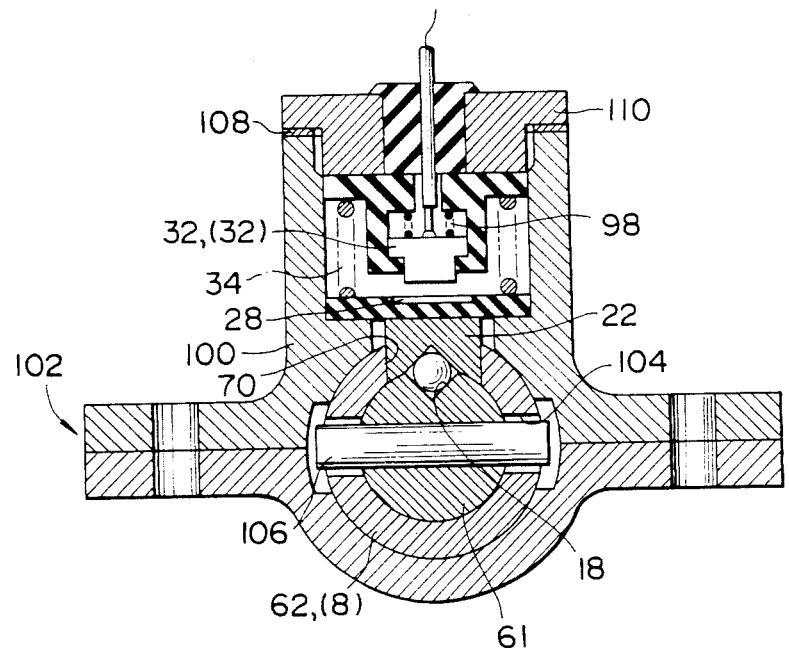

FIGS. 11 and 12 show a sixth embodiment of the present invention. This embodiment is essentially the same as the fifth but features spring loaded (via springs 98) stationary contacts 32 to additionally safeguard against damage due to excessive applications of torque on the steering wheel and/or the repeated impacting of the movable contact 28 on the stationary contacts. Another feature of this arrangement is that the housing 100 in which the switch is disposed is formed in the upper half of an arrangement 102 which may be clamped onto either a steering shaft section connection sleeve (e.g. in FIGS. 1–3) or the input shaft 62 of the power steering control valve (such as shown in FIGS. 8 and 9). Further, in this embodiment the input shaft 62 for example, is formed with a radial bore 70 in which the piston 22 is reciprocatively disposed and a through bore 104 which functions as part of a lost motion connection. As shown, in this arrangement the steering shaft 61 is formed with a "V" shaped groove 18 and further has a pin 106 disposed therethrough. As in the previous embodiment the pin 106 is smaller in diameter than the through bore 104 so that sufficient rotation of the steering shaft 61 within the input shaft 62 can occur to engage the movable contact 28 with the stationary ones (32) prior to engagement of pin 106 on the shoulders of the through bore 104.

To permit fine adjustment of the clearance between the movable contact 28 and the stationary ones (32) it is deemed advantageous to employ a shim 108 which, in this embodiment, is interposed between the cap 110 and the open end of the stepped bore in which the switch proper is disposed. This, along with the appropriate selection of the spring holding the contacts apart and against which the camming action of the roller and groove arrangement acts, facilitates the adaptation of the same basic sensor construction to different types and sizes of vehicle and/or for mass production variation.

Figure 13:
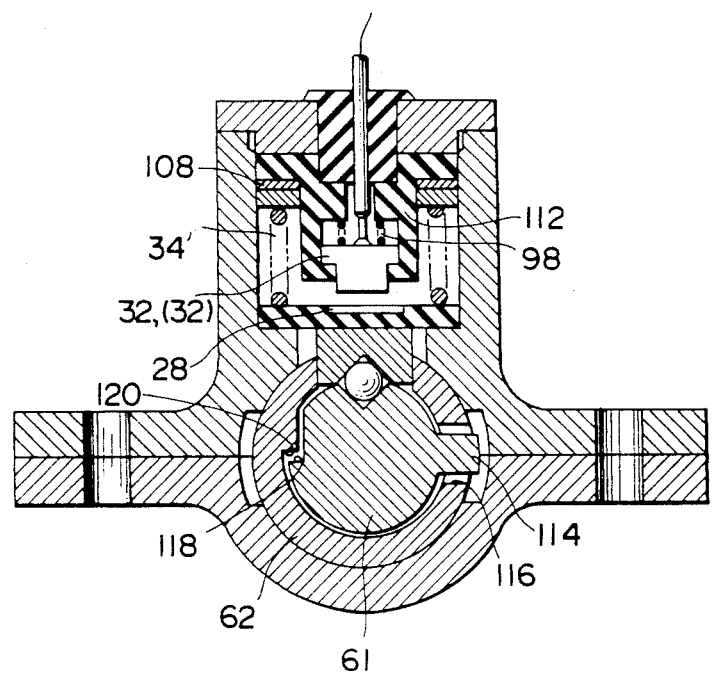
FIG. 13 is a cross-sectional view of a seventh embodiment of the present invention.

FIG. 13 shows a seventh embodiment of the present invention. In this arrangement the shim 108 mentioned in connection with the previous embodiment is shown placed between the upper end of the spring 34 and the synthetic resin contact holder 112 in which the stationary contacts are disposed.

In this figure two possible lost motion arrangements are illustrated. One of these takes the form of a projection 114 formed integrally with the steering shaft 61 and which is arranged to project through a suitably sized aperture 116 formed in the input shaft 62, while on the left, the steering shaft 61 is notched to form a shoulder 118 which is adapted to contact a corresponding shoulder 120 formed on the inner wall of the input shaft 62. As in the previous embodiments the dimensions of the just mentioned lost motion arrangements are selected to permit the movable contact 28 of the switch to contact the stationary contacts (32, 32) before providing an absolutely positive drive connection between the input shaft 62 and the steering shaft 61.

FIG. 14 shows an example of a steering wheel column arrangement on which the present invention may be provided.

In this arrangement the upper steering shaft section 122 is hollow and is adapted to engage the lower shaft 124 section through an impact absorbing device 126 which includes steel balls 128 which spread and distort the upper section 122 as it telescopes over the lower section 124 during a collision. This arrangement further includes an elastomeric insulator 130 which is used to interconnect the lower shaft section 124 with a connection sleeve 132. This insulator or bush 130 functions to damp road shocks originating at the steering wheels of the vehicle and prevent such shocks from being transmitted to the steering wheel 1. A lost motion connection generally denoted by the numeral 134 is provided between the lower shaft section 124 and the connection sleeve 132. This, as best seen in FIG. 16, consists of the pin 136 which engages the walls of radial bore 138 formed in the connection sleeve 132. This, upon sufficient torque being applied via the steering wheel 1, permits the pin 136 to engage with the connection sleeve 132 to provide a positive drive connection therebetween.

With the above described arrangement, a suitable site for a steering effort sensor is found at the open end of the connection sleeve 132.

Figure 17:
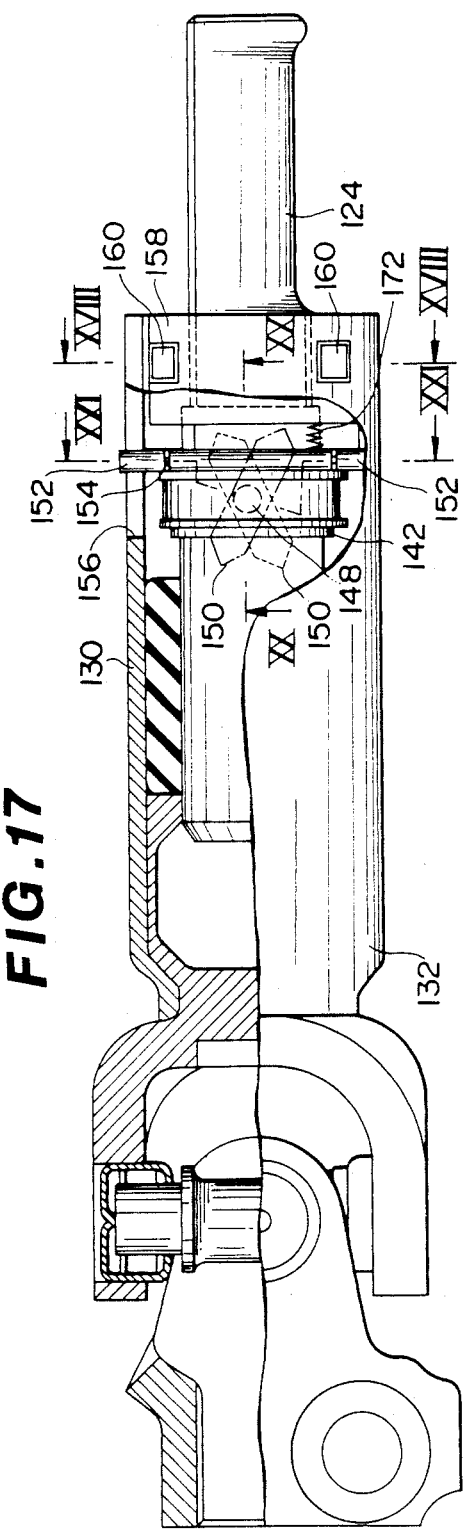
FIG. 17 is a sectional view showing an eighth embodiment of the present invention.
Figure 18:
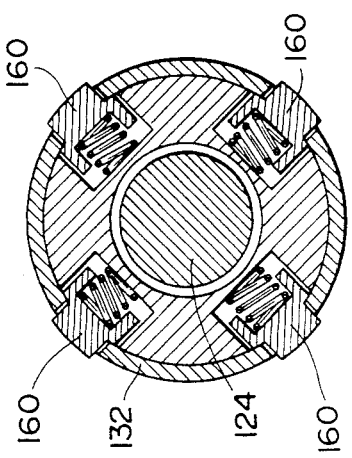
FIG. 18 is a sectional view taken along section line XVIII—XVIII of FIG. 17.
Figure 19:
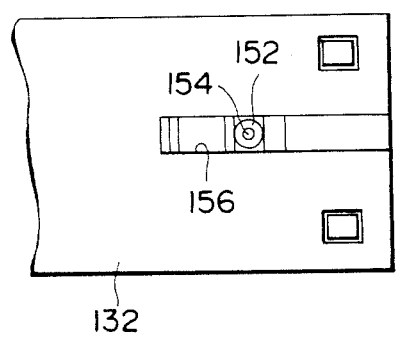
Figure 20:
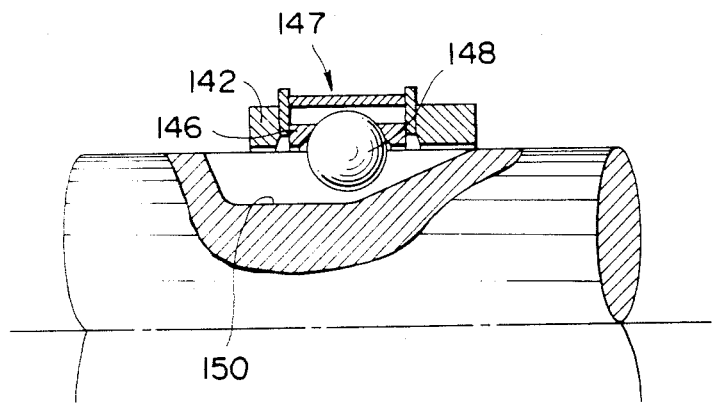
Figure 21:
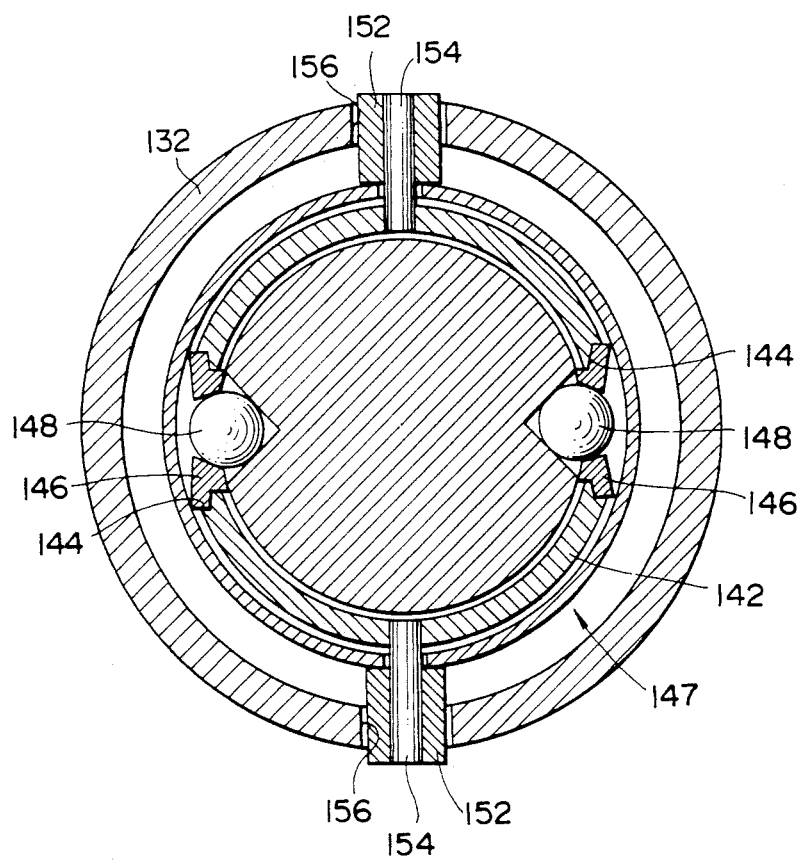
Figure 22:
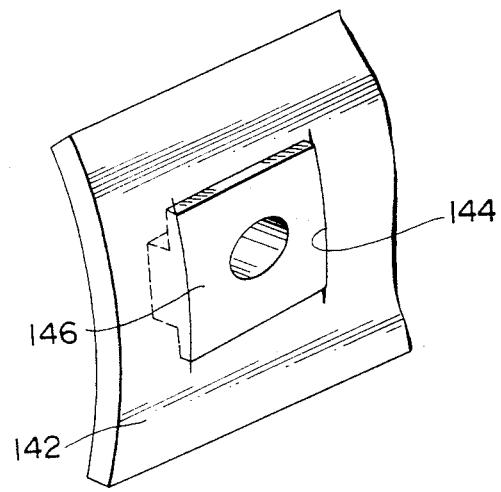
Figure 23:
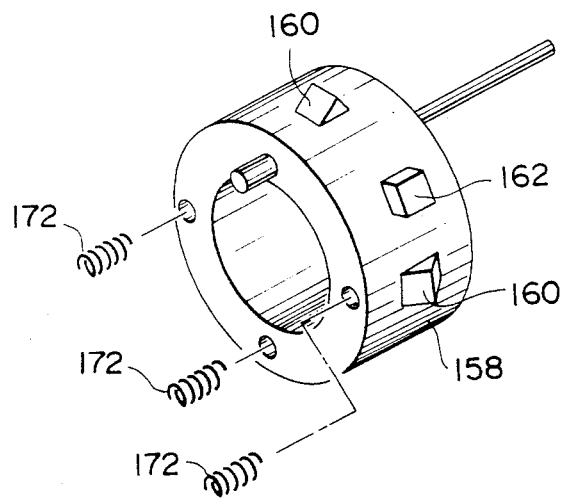

FIGS. 17 to 25 show an eighth embodiment of the present invention which may be disposed in the above-mentioned site. This arrangement consists of an annular sleeve member 142 (or collar) which is slidably disposed on the lower shaft section 124 and which is provided (as shown in FIGS. 20–22) with apertures 144 in which ball holders 146 are disposed. As shown, holding the ball holders 146 in position is a retainer ring and snap ring arrangement 147. The balls 148 retained in the ball holders 146 are adapted to run in "V" shaped grooves 150 formed in the lower shaft section 124. As shown in FIG. 17, the two grooves 150 tend to extend "spirally" about the lower shaft section 124 and are located thereon in essentially diametrically opposed positions.

As seen in FIGS. 19 and 21, rollers 152 are disposed on pins 154 studded onto the annular collar 142, and elongate slots 156 slightly wider than the rollers 154 are formed in the connection sleeve 132. With this arrangement upon the lower shaft section 124 being rotated, the rollers 152 are brought into contact with the sides of the elongate slots 156 producing a reaction between the balls 148 and the grooves 150 which induces the collar 142 to slide along the lower shaft section 124 in a direction which is dependent on the direction of rotation of the shaft 124 and the angle of the grooves 150. Movement of the collar 142 away from or toward the steering wheel 1 is detected by a switch arrangement which is housed in an annular switch housing 158. As will be best appreciated from FIG. 23, the switch housing 158 is essentially annular and is adapted to be retained in place in the end of the connection sleeve 132 by retractable projections 160. In this embodiment the housing 158 is grounded through a grounding contact 162 which acts as one terminal of the switch.

Figure 24:
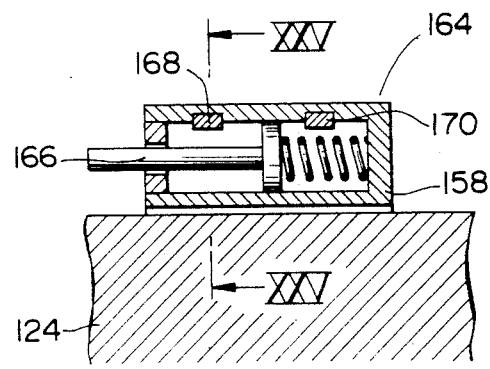
Figure 25:
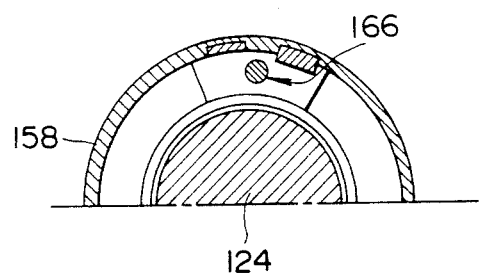
Figure 26:
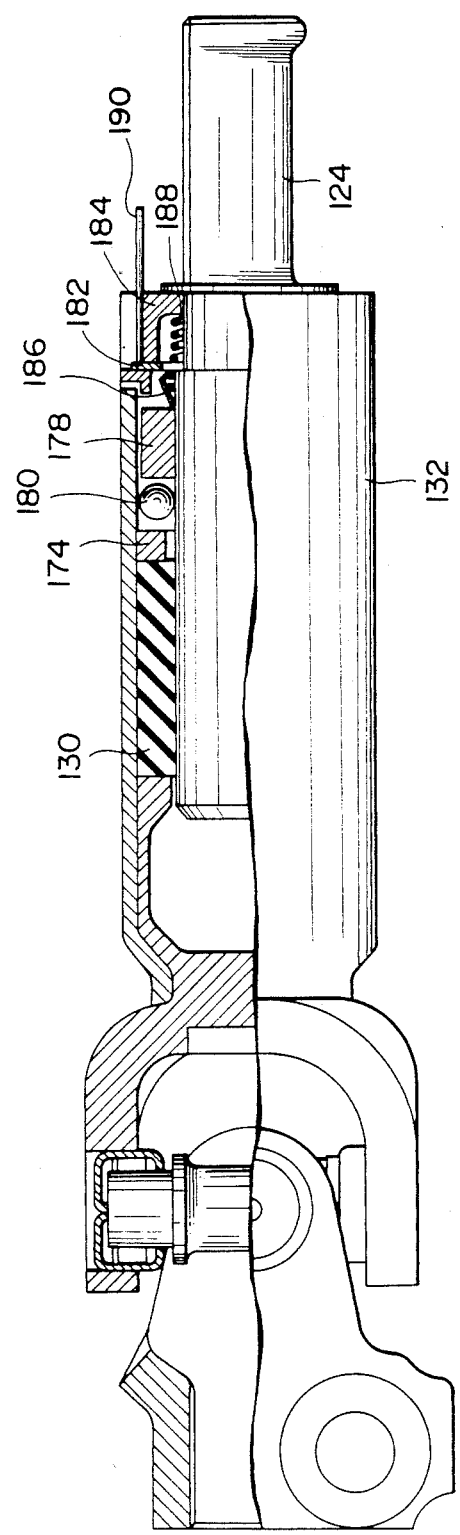
FIGS. 26 to 29 show a ninth embodiment of the present invention.
Figure 27:
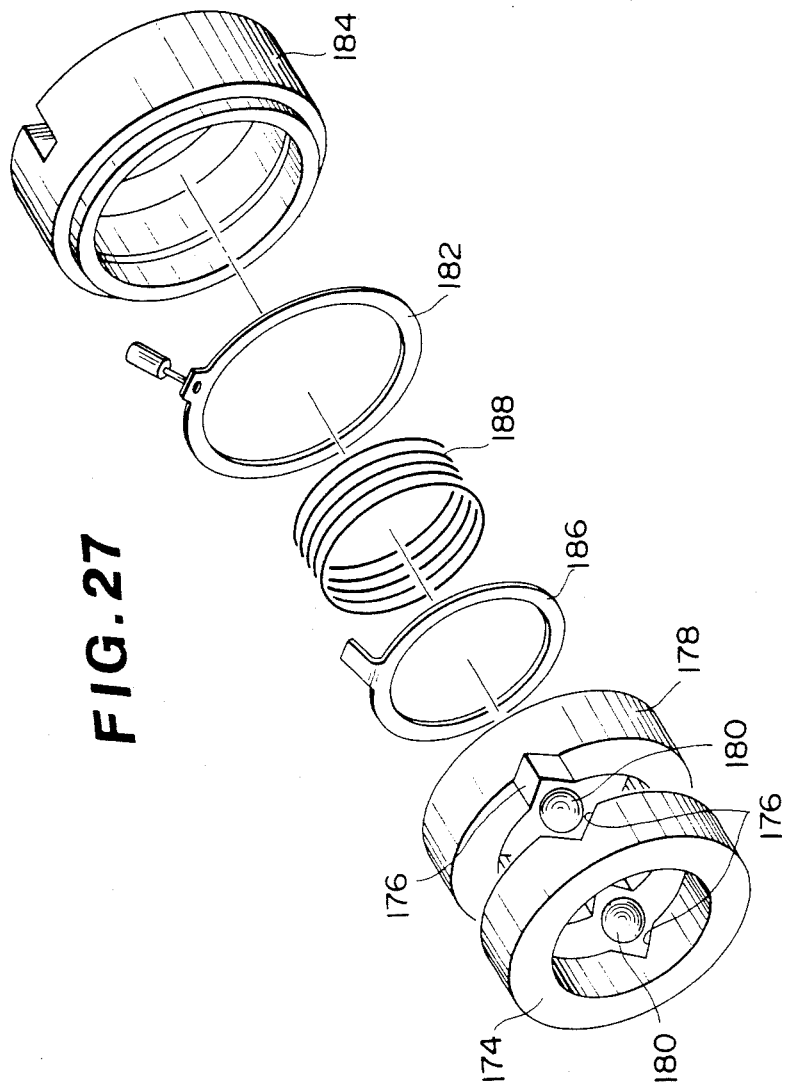
Figure 28:
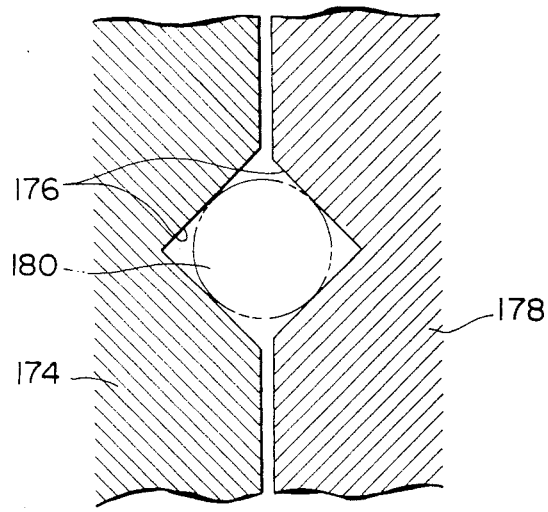

Operatively disposed within the switch housing is a limit switch 164 which, as shown in FIG. 24, includes a spring biased piston arrangement 166 adapted to move forward and backward in response to the movement of the collar 142 to come into contact with one of two live contacts (168, 170) thus grounding the contact and therefore closing the switch. In this arrangement springs 172 are provided to provide a connection between the switch housing 158 and the collar 142 and which are adequate for preventing rattling or oscillation of the latter. Accordingly, these springs (172) are quite weak and are not used to provide a reaction to the camming action provided by the ball and groove arrangement.

FIGS. 26 to 29 show a ninth embodiment of the present invention.

In this arrangement a first annular member 174 in which "V" shaped grooves 176 are formed, is fixedly disposed in the connection sleeve 132 while a corresponding annular member 178 is splined on the lower shaft section 124. Balls 180 are interposed between the "V" shaped grooves 176 thereof, so that upon relative rotation occuring between the lower shaft section 124 and the connection sleeve 132, the ball and groove arrangement splits the torque applied through the lower shaft section 124 to produce simultaneous rotation of the connection sleeve 132 and to cause the annular member 178 to move away from the annular member 174. Movement of the annular member 178 is detected by a switch arrangement consisting of a live electrode 182 insulatingly mounted on a contact holder 184 and a grounding electrode 186 mounted on the annular member 178. A spring 188 is interposed between the contact holder 184 and the movable annular member 178 to bias the latter toward the fixed annular member 174 thus separating the live and grounding electrodes 182, 186 and providing a reaction against the camming action produced during steering. As shown, the live electrode 182 is connected to a lead wire 190.

Figure 29:
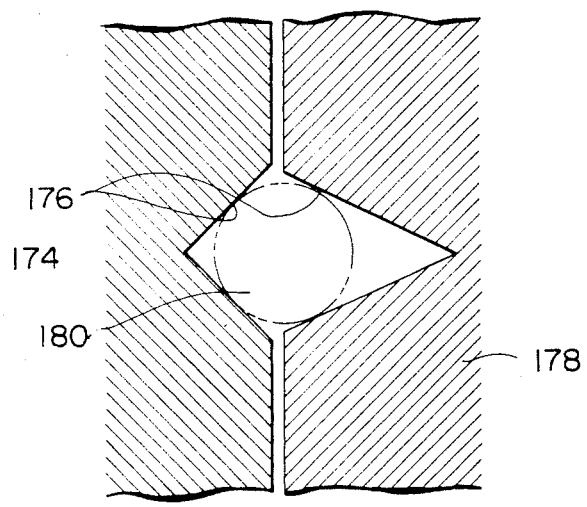
Figure 30:
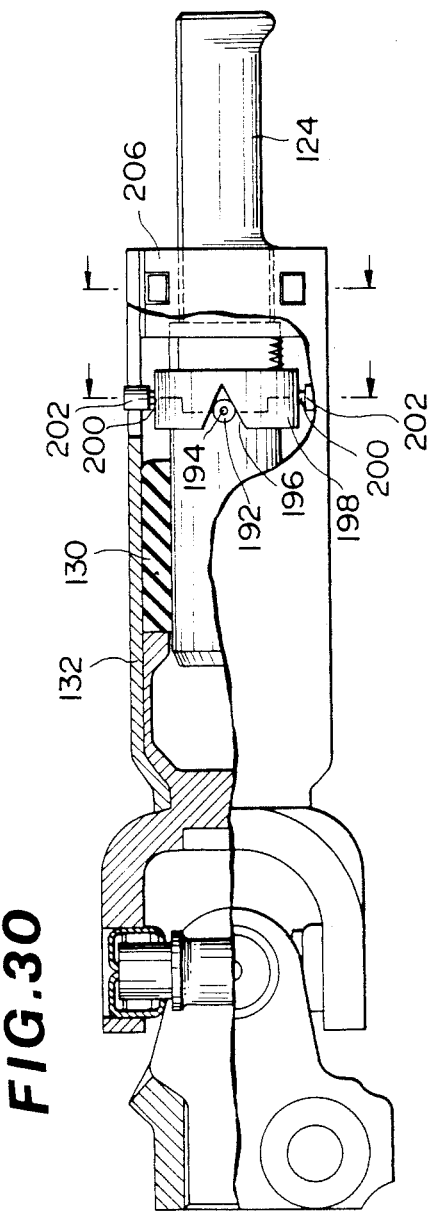
FIGS. 30 to 33 show a tenth embodiment.
Figure 31:
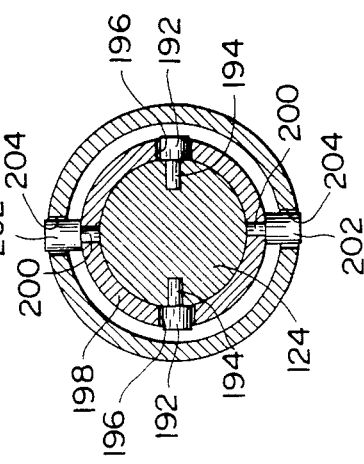
Figure 32:
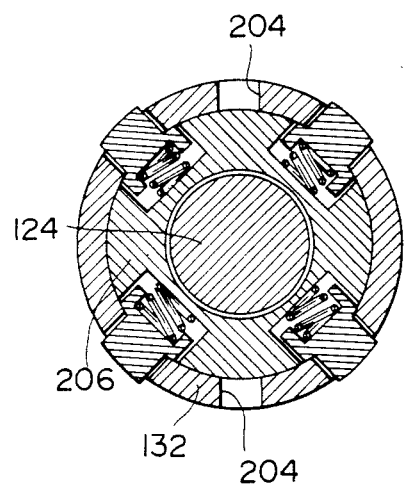
Figure 33:
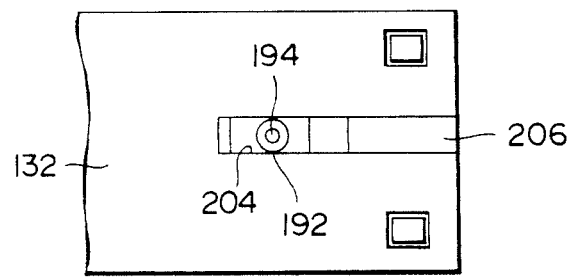

It will be appreciated that with the invention the desired camming effect may be obtained by selecting the dimensions of the cam grooves and further that, by changing the dimensions of one of the cooperating grooves, as shown in FIG. 29, uneven wear of the rolling elements may be obviated.

FIGS. 30 to 33 show a tenth embodiment of the present invention. In this arrangement rollers 192 are mounted on pins 194 studded on the lower steering shaft section 124 and adapted to seat in "V" shaped grooves 196 formed in a collar 198. The collar 198 is in turn provided with pins 200 on which rollers 202 are mounted. These rollers (202) are arranged in elongate slots 204 formed in the connection sleeve 132.

A switch housing 206 similar to that of the embodiment of FIGS. 17-23 is disposed in the mouth of the connection sleeve 132 with a switch, disposed therein, operatively connected with the collar 198 to detect the movement thereof. In this embodiment springs 208 are interposed between the switch housing 206 and the collar 198 to bias the collar 198 against the reaction produced by the camming action of the rollers and grooves.

With this arrangement, upon torque being applied to the steering shaft through the steering wheel, the rollers 192 will react with the sides of the "V" shaped grooves 196 in a manner to drive the collar 198 back against the bias of the springs 208 while causing the collar to rotate in synchronism with the steering shaft 61. This movement of course is detected by the switch disposed in the switch housing which may be the same as that disclosed in connection with the embodiment of FIGS. 17-23.

What is claimed is:
1. In an apparatus
   a first rotatable shaft;
   a second rotatable shaft; and
   a rotation effort sensor which interconnects said first and second shafts in a manner to induce synchronous rotation thereof when one of said first and second shafts is rotated, said rotation effort sensor comprising:
   means defining a groove in said first shaft;
   means defining a bore in said second shaft; and bore having an axis essentially normal to the axis of said first shaft;
   a piston reciprocatively disposed in said bore;
   means defining a groove in said piston;
   a rolling element constantly retained in the grooves in said first shaft and said piston for establishing a drive connection between said first and second shafts, said drive connection being such as to displace said piston within said bore while inducing synchronous rotation of said first and second shafts when one of said first and second shafts is rotated; and
   a switch responsive to a predetermined displacement of said piston within said bore.
2. A rotation effort sensor as claimed in claim 1, further comprising a contact arrangement including:
   an annular contact fixed to said second shaft for rotation therewith, said annular contact being electrically connected with said switch; and
   a stationary contact mounted adjacent to and in electrical contact with said annular contact.
3. A rotation sensor as claimed in claim 1, wherein said switch is disposed in a housing threadedly engaged with said second shaft.
4. A rotation effort sensor as claimed in claim 3, wherein said housing includes a threaded bore in which a threaded cap member is threadedly received;
   a first contact adapted to be moved toward said cap member by said piston; and
   a second contact mounted on said cap member juxtaposed with said first contact in a manner to be contacted by said first contact upon said piston being displaced through said predetermined displacement.
5. A rotation effort sensor as claimed in claim 1, wherein said switch further includes a spring which biases said piston in a direction that tends to urge the groove in said piston toward the groove formed in said first shaft and sandwich said rolling element therebetween.
6. A rotation effort sensor as claimed in claim 1, wherein said switch is disposed in a housing secured to said second rotatable shaft, said housing including a bore coaxial with that defined in said second shaft and through which said piston projects.
7. In an apparatus
   a first rotatable shaft;
   a second rotatable shaft; and
   a rotation effort sensor which interconnects said first and second shafts in a manner to induce synchronous rotation thereof when one of said first and second shafts is rotated, said rotation effort sensor comprising:
means defining a groove in said first shaft;
a housing secured to said second shaft for synchronous rotation therewith;
means defining a bore in said housing;
a piston reciprocatively disposed in said bore;
means defining a groove in said piston;
a rolling element constantly retained in said grooves in said first shaft and said piston for establishing a drive connection between said first shaft and said housing and second shaft, said drive connection tending to displace said piston within said bore while inducing said housing and second shaft to rotate synchronously with said first shaft when one of said first and second shafts is rotated; and
a switch disposed in said housing, said switch being responsive to said piston being displaced within said bore by a predetermined amount.

8. A rotation effort sensor as claimed in claim 7, further comprising:
a lost motion connection between said first and second shafts, said lost motion connection establishing a positive drive connection between said first shaft and said second shaft upon a predetermined amount of relative rotation occurring therebetween, said predetermined amount of relative rotation being greater than that which can occur between said first and second shafts before said piston is displaced through said predetermined displacement.

9. A rotation effort sensor as claimed in claim 8, wherein said lost motion connection takes the form of a pin which is disposed through said first shaft and arranged to engage a shoulder of a recess formed in one of said housing and said second shaft.

10. A rotation effort sensor as claimed in claim 7, wherein said housing is formed of first and second pieces which are secured together in a manner to securely clamp said second shaft therebetween.

11. In an apparatus
a first rotatable shaft;
a second rotatable shaft, said second shaft including a hollow portion in which an end of said first shaft is received;
a piston, said piston being reciprocatively disposed in an aperture defined in said hollow portion of said second shaft;
a switch responsive to a predetermined displacement of said piston;
means defining a groove in one of (a) said first shaft and (b) said piston;
a rolling element constantly retained in said groove, said rolling element establishing a drive connection between said first shaft and said piston which induces simultaneous rotation of said first and second shafts and which displaces said piston in a manner to operate said switch when one of said first and second shafts is rotated in excess of a predetermined amount.

12. An apparatus as claimed in claim 11, wherein said hollow portion is defined by a housing secured to an end of said second shaft.

13. An apparatus as claimed in claim 11 wherein said aperture takes the form of a bore having an axis essentially normal to the axis of said second shaft.

14. A torque transferring and rotational effort sensing apparatus comprising in combination:
a rotatable shaft;
a rotatable cylindrical member having an end of said shaft received therein and coaxial therewith;
a rotatable and translationally movable member disposed radially outwardly of said rotatable shaft and adjacent thereto; said movable member drivingly engaging said cylindrical member for rotation therewith;
switch means mounted on said rotatable cylindrical member adjacent said movable member such that said switch means is actuable by translational movement of said movable member a predetermined distance toward said switch means;
biasing means for urging said movable member away from said switch means;
a groove formed on one of said rotatable shaft and said movable member;
roller means supported and constantly retained in said groove by the other of said rotatable shaft and said movable member such that rotation of said shaft in causes both rotational movement of said movable member and said cylindrical member essentially synchronously with said shaft and translational movement of said movable member toward said switch means against the force of said biasing means a distance sufficient to actuate said switch means.

15. An apparatus as claimed in claim 14, wherein said movable member is translationally movable radially of said shaft.

16. An apparatus as claimed in claim 14, wherein said movable member is translationally movable axially of said shaft.

* * * * *